May 29, 1934. P. F. BOEYE Re. 19,181

SHIPPING CONTAINER FOR INDIVIDUAL BATTERIES

Original Filed April 13, 1928

Inventor

Paul F. Boeye

By Stryker & Stryker

Attorneys

Reissued May 29, 1934

Re. 19,181

UNITED STATES PATENT OFFICE 19,181

SHIPPING CONTAINER FOR INDIVIDUAL BATTERIES

Paul F. Boeye, St. Paul, Minn., assignor to Waldorf Paper Products Company, St. Paul, Minn., a corporation of Minnesota Original No. 1,837,012, dated December 15, 1931, Serial No. 269,689, April 13, 1928. Application for reissue April 14, 1933, Serial No. 666,220

8 Claims. (Cl. 206—65)

This invention relates to improvements in containers for dry cells or batteries of the larger, rectangular type used principally for radio receiving sets. In a copending application, Serial No. 181,746, filed by Paul A. Schilling and myself on April 7, 1927, a two piece slide or "Lambert" for such batteries is described and the present invention is an improvement thereon.

Such batteries have projecting terminals which are apt to be broken in transit or handling and their weight is sufficient to compress or crush the corrugations or corrugated board if substantial movement is permitted in the shipping package. Thus I have discovered that while a limited degree of resiliency in the package is required to prevent breakage of the battery, an excessive amount of cushioning is undesirable because it permits shifting of the contents, and gradual compression of the corrugations under the resulting impact, until the protection is impaired or destroyed. The present invention is designed to meet these conditions.

It is my object to reduce the cost of such containers and at the same time to increase their strength and the protection to the goods by constructing the outer casing from solid fibre board and the inner cushion member from corrugated sheet material.

A further object is to provide an improved guard for the battery terminals which is positioned between the battery and the container to maintain the terminals in spaced relation to the cover.

Figure 1:
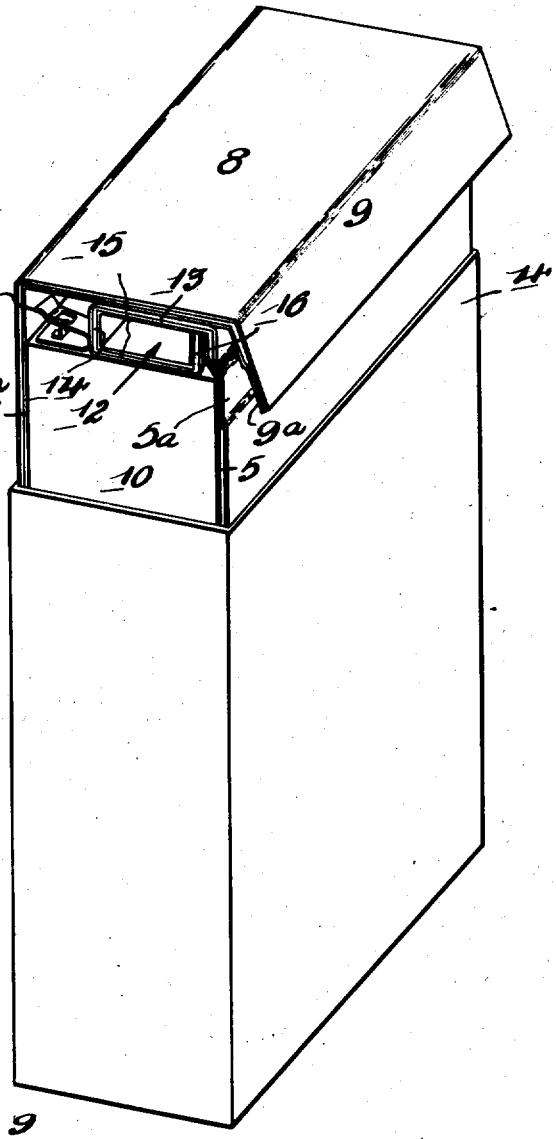
Figure 2:
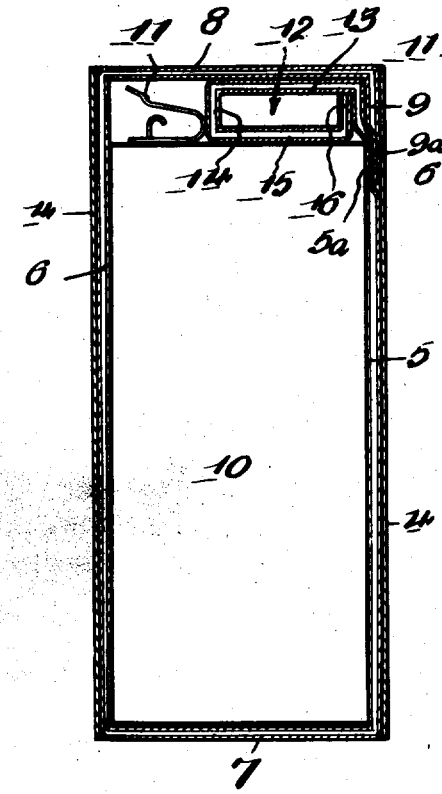
Figure 3:
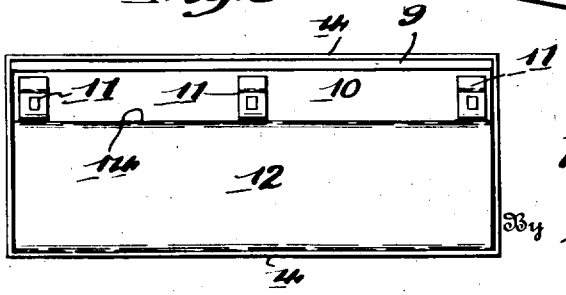

The invention will be best understood by reference to the accompanying drawing in which Figure 1 is a perspective view of my improved container with the battery and inner cushion member partially withdrawn from the outer sleeve or casing; Fig. 2 is a vertical, longitudinal section through the container with the parts in closed position and with a battery in place therein and Fig. 3 is a plan view of the same with the cover open.

The container has an outer, tubular casing 4 which is formed from solid fibre board, open at its top and bottom ends to receive an inner corrugated member which is insertible from either end of the casing 4. The inner member is formed from a single rectangular blank of corrugated board which is creased transversely to form two parallel side walls 5 and 6, a bottom 7, cover flap 8 and flange 9 extending along the normally free edge of the cover flap 8. The battery 10, to be inserted in the container, is of the common rectangular type having projecting terminals 11 on its top. To protect these terminals a hollow, tubular guard 12 is made integral with one end of the blank constituting the walls 5, 6 and 7. The guard 12 is an extension on the normally upper end of the side wall 5 which is folded to form four rectangularly disposed walls 13, 14, 15 and 16. The wall 13 is arranged to abut against the inner surface of the cover flap 8, while the wall 14 extends downward, perpendicular to the cover flap 8 and abuts against the terminals 11. The wall 15 rests upon the top of the battery 10 and the fourth wall 16 is normally positioned parallel to the side wall 5 and wall 14. Thus the guard consists of walls 13, 14, 15 and 16 arranged to abut respectively against the cover flap 8, terminals 11, top of the battery 10 and inner surface of the side wall 5. The cover flange 9 and side wall 5 have overlapping portions 9*a* and 5*a* respectively in which the corrugations of the sheet are flattened so that the combined thickness of these overlapping portions is equal to the normal thickness of the corrugated sheet.

In use, a battery 10 is inserted in the inner, corrugated member of the container with the side walls 5 and 6 covering the opposite, wider sides of the battery and the bottom of the battery resting on the bottom 7 of the corrugated blank. Now the guard member 12 on the upper edge of the side wall 5 is folded to hollow, rectangular form upon the top of the battery and the cover is closed as indicated in Figs. 1 and 2. The battery thus covered by the inner, corrugated member may now be inserted in the tubular casing 4 as indicated in Fig. 1 and the cover flange 9 inserted between said casing and the battery. The cover flap 8 is frictionally held in closed position by the overlapping portions 9*a* and 5*a* which fit snugly between the battery and casing 4. For the final sealing, binding strips of the common type held in place by adhesive may be applied over the edges of the cover flap 8 and bottom 7.

When the container is thus closed, the guard 12 for the terminals 11 is securely held in rectangular form because each of the four walls 13, 14, 15 and 16 is confined by one of the several abutments for their outer surfaces. Obviously the walls 14 and 16 retain the terminals 11 in spaced relation to the cover flap 8.

As is well known, corrugated board has considerable rigidity and strength to oppose forces tending to crush it longitudinally of the corrugations. Thus the walls 14 and 16 form rigid brace members which are not compressible under the weight of the batteries. An excessive amount of cushioning is avoided by my arrangement because the walls 14 and 16 are less compressible than the equivalent thickness of sheets laid flat upon the top of the battery.

The container has the further advantage of permitting the cover to be opened for inspection and testing purposes without removing the guard 12. Tests of containers made according to this invention have shown that such containers afford greater protection to the batteries and withstand harder usage than containers having outer casings of corrugated board but otherwise of the same construction as that shown and described.

Having described my invention what I claim is new and desire to protect by Letters Patent is:

1. A container for a battery having projecting terminals on its top to be protected, comprising an outer tubular casing open at its top and bottom ends and formed from solid fibre board, an inner cushion member formed from a rectangular sheet of corrugated board folded to extend upon the bottom and two sides of a battery therein and forming a cover flap and a rectangular hollow guard for the terminals of said battery confined and supported at four sides respectively by said terminals, battery, cover flap and cushion member.

2. In a container for a battery having projecting terminals on its top to be protected, a cushion member formed from a sheet of corrugated board folded to extend upon the bottom and two sides of a battery therein and also forming a tubular, rectangular guard for the terminals of said battery, said guard having the corrugations on at least two walls extending perpendicularly to the top of the battery and said walls being supported against collapse by engagement of one of them with said terminals, and means for confining said guard on the top of the battery.

3. In a container for a battery having projecting terminals on its top to be protected, a cushion member formed from a sheet of corrugated board folded to extend upon the bottom and two sides of a battery therein and forming a cover flap and a tubular guard for the terminals of said battery, said guard having the corrugations on at least two walls extending perpendicularly to the top of the battery and said walls abutting respectively against said terminals and the inner surface of the cushion member, said cover flap being arranged to confine said guard on the top of the battery.

4. In a container for a battery having projecting terminals on its top to be protected, a cushion member formed from a rectangular sheet of paper board folded to extend upon the bottom and two sides of the battery and forming a cover flap and a rectangular hollow guard for the terminals of said battery confined and supported at four sides respectively by said terminals, battery, cover flap, and cushion member.

5. In a container for a battery having projecting terminals on its top to be protected, a cushion member formed from a rectangular sheet of paper board folded to extend upon the bottom and two sides of the battery and forming side walls, and bottom and a cover flap, and a guard for the terminals of said battery issuing from one of said side walls, said guard including two walls, one of said walls being folded inwardly from the upper edge of the side wall and underlying said cover flap, another wall underlying said first wall and extending back toward said side wall, said second wall lying parallel with the first wall of the guard, and being spaced therefrom both of said walls being shorter than said cover flap to provide a space between said guard and the other side wall for the reception of the terminals of the battery, and means for holding said walls apart.

6. In a container for a battery having projecting terminals on its top to be protected, a cushion member formed from a rectangular sheet of paper board folded to extend upon the bottom and two sides of the battery and forming side walls, and bottom and a cover flap, a guard for the terminals of said battery issuing from one of said side walls, said guard including two walls, one of said walls being folded inwardly from the upper edge of the side wall and underlying said cover flap, another wall underlying said first wall and extending back toward said side wall, said second wall lying parallel with the first wall of the guard and being spaced therefrom both of said walls being shorter than said cover flap to provide a space between said guard and the other side wall for the reception of the terminals of the battery, and means integral with said cushion member for holding said walls apart.

7. In a container for a battery having projecting terminals on its top to be protected, a cushion member formed from a narrow rectangular sheet of paper board folded over to form contiguous panels covering four sides of the battery, two of said panels meeting along the corner of the container situated at the upper end of the container opposite said terminals and a guard for disposition between the top panel and the top of the battery and to one side of said terminals, said guard being integral with the cushion member and issuing inwardly into the same and being connected to said cushion member at said corner.

8. In a container for a battery having projecting terminals on its top to be protected, a cushion member formed from a narrow rectangular sheet of paper board folded over to form contiguous panels covering four sides of the battery, two of said panels meeting along the corner of the container situated at the upper end of the container opposite said terminals and a guard for disposition between the top panel and the top of the battery and to one side of said terminals, said guard being constructed with folded parts overlying one another and integral with said cushion member, said guard issuing inwardly into the cushion member and being connected to the cushion member at said corner.

PAUL F. BOEYE.